United States Patent [19]
Hill

[11] Patent Number: 6,089,663
[45] Date of Patent: Jul. 18, 2000

[54] VIDEO GAME ACCESSORY CHAIR APPARATUS

[75] Inventor: Peter C. Hill, Plano, Tex.

[73] Assignee: Spang & Company, Butler, Pa.

[21] Appl. No.: 09/245,525

[22] Filed: Feb. 5, 1999

[51] Int. Cl.$^7$ .................................................. A47C 3/029
[52] U.S. Cl. ................................. 297/258.1; 297/188.01;
297/217.3; 297/217.4; 297/170; 297/172;
297/271.5
[58] Field of Search ........................... 297/188.01, 217.3,
297/217.4, 170, 172, 271.5, 258.1

[56] References Cited

U.S. PATENT DOCUMENTS

| | | |
|---|---|---|
| D. 260,823 | 9/1981 | Stulik, Jr. . |
| D. 266,119 | 9/1982 | Larsen . |
| D. 274,581 | 7/1984 | Gallock . |
| D. 314,869 | 2/1991 | Entratter . |
| D. 327,780 | 7/1992 | Peters . |
| D. 329,146 | 9/1992 | Neal . |
| D. 332,703 | 1/1993 | Gulliver . |
| D. 334,487 | 4/1993 | Perry . |
| D. 365,451 | 12/1995 | Shahid . |
| 1,846,393 | 2/1932 | Hankins ........................... 297/271.5 X |
| 2,661,954 | 12/1953 | Koci .................................. 297/217.3 X |
| 2,985,229 | 5/1961 | Shamblin ................................ 297/410 |
| 3,027,194 | 3/1962 | Rumptz .................................. 297/410 |
| 3,041,070 | 6/1962 | Kerstein ........................... 297/271.5 X |
| 3,063,751 | 11/1962 | Hatch ...................................... 297/410 |
| 3,157,434 | 11/1964 | Gianvecchio ............................. 297/397 |
| 3,317,244 | 5/1967 | Ferro ........................................ 297/410 |
| 3,507,538 | 4/1970 | Stoller ..................................... 297/410 |
| 3,563,603 | 2/1971 | D'Aprile et al. ........................ 297/410 |
| 3,586,366 | 6/1971 | Patrick ................................ 297/410 X |
| 3,680,915 | 8/1972 | Freedman et al. ...................... 297/410 |
| 3,698,765 | 10/1972 | Olsen .................................. 297/410 X |
| 3,719,963 | 3/1973 | Fortnam ............................. 297/410 X |
| 3,774,963 | 11/1973 | Lowe ................................... 297/410 X |
| 4,025,107 | 5/1977 | Chippa .............................. 297/258.1 X |
| 4,440,443 | 4/1984 | Nodskog ........................... 297/217.4 X |
| 4,461,470 | 7/1984 | Astroth et al. . |
| 4,494,754 | 1/1985 | Wagner, Jr. . |
| 4,598,946 | 7/1986 | Cone ..................................... 297/258.1 |
| 4,817,950 | 4/1989 | Goo . |
| 4,974,904 | 12/1990 | Phillips et al. ........................ 297/258.1 |
| 5,054,771 | 10/1991 | Mansfield . |
| 5,143,055 | 9/1992 | Eakin ................................ 297/217.4 X |
| 5,195,746 | 3/1993 | Boyd et al. . |
| 5,290,034 | 3/1994 | Hineman . |
| 5,407,246 | 4/1995 | Meeker et al. .................... 297/258.1 X |

(List continued on next page.)

FOREIGN PATENT DOCUMENTS

| | | | |
|---|---|---|---|
| 2114245 | 12/1972 | Germany ........................... 297/217.4 |
| 1342284 | 1/1974 | United Kingdom ................ 297/217.4 |
| 94/00206 | 1/1994 | WIPO ................................. 297/217.4 |

OTHER PUBLICATIONS

The Intensor Survival Guide, BSG Labs, Inc. (2 pages, Date Unknown).
Cool Tools, Virtual Vehicle, JD Yahoo! Internet Life, Sep. 1998, p. 50.
The Step 2 Company, Lazy J Chairs (1 page, Date Unknown).

Primary Examiner—Peter M. Cuomo
Assistant Examiner—Rodney B. White
Attorney, Agent, or Firm—Kirkpatrick & Lockhart LLP

[57] ABSTRACT

An accessory chair apparatus for use with video games, the apparatus comprising a concave base, a seat portion, and a console. The base is shaped so as to facilitate a rocking motion in both a front to back and a side to side direction. However, body stabilizers may also to deployed as to prevent such rocking. The seat portion may include a back portion upon which a headrest may be adjustably mounted. The headrest may include at least one audio speaker mounted therein to enhance the game playing experience. The console is adjustably mounted on the front end of the base so as to ensure comfortable seating for occupants of various sizes. Also, a controller mounted frame may be placed on the console so as to accept a game controller, such as, for example, a steering wheel. The apparatus may also include a variety of storage compartments such as a basket, a case, and recesses in the body and the case.

46 Claims, 9 Drawing Sheets

U.S. PATENT DOCUMENTS

| | | |
|---|---|---|
| 5,419,613 | 5/1995 | Wedeking . |
| 5,437,453 | 8/1995 | Hineman . |
| 5,476,304 | 12/1995 | Gulliver et al. . |
| 5,515,078 | 5/1996 | Greschler et al. . |
| 5,573,320 | 11/1996 | Shearer . |
| 5,612,718 | 3/1997 | Bryan . |
| 5,669,818 | 9/1997 | Thorner et al. . |
| 5,690,387 | 11/1997 | Sarti ........ 297/397 |
| 5,820,210 | 10/1998 | Shipman et al. ........ 297/188.01 |
| 5,887,944 | 3/1999 | Boost ........ 297/271.5 X |
| 5,918,941 | 7/1999 | Kigel ........ 297/410 |

VIDEO GAME ACCESSORY CHAIR APPARATUS

CROSS-REFERENCE TO RELATED APPLICATIONS

Not applicable.

FEDERALLY SPONSORED RESEARCH

Not applicable.

BACKGROUND OF THE INVENTION

1. Field of the Invention

This invention relates to chair apparatuses, and in particular, to an apparatus that may be used as an accessory for playing video games.

2. Description of the Invention Background

Home video games enjoy great popularity in today's society. As the capabilities of microcomputer programs continue to grow at astonishing rates, the graphics and audio of today's video games have become more life-like and, in some cases, intense. As a result, to enhance the game playing experience, there have been many efforts to provide accessories for use with such games.

Specifically, video game accessories in the, form of chair apparatuses have been developed. For example, U.S. Pat. No. 5,290,034 and U.S. Pat. No. 5,437,453 to Hineman ("Hineman") disclose an adjustable height game chair with footrests and an integral joystick. The chair apparatus is pivotally movable by the user of the seat. In one embodiment, the chair apparatus includes a movable plate to which the joystick is secured. Here, movement of the plate actuates switches that provide output signals to an electronic game. In the second embodiment, the joystick provides output signals directly to switches which, in turn, provide a signal for an electronic game.

U.S. Pat. No. 5,419,613 to Wedeking ("Wedeking") discloses a platform connected to a chair on which a video game controller is secured. In Wedeking, an elongated structure connects to the platform at one end and connects to the chair by way of a base at the other end. Wedeking discloses a "leg-less rocker" to which the platform of the invention is affixed. The chair is legless, consisting simply of a seat and backrest.

U.S. Pat. No. 5,195,746 to Boyd et al. ("Boyd") discloses an aircraft simulator that includes a movable seat facing a video display. The seat disclosed in Boyd can be tilted about a central socket that connects the seat to a base and includes a control that causes the image on the video display to shift in response to the tilting movement of the seat. As in Hineman, Boyd requires use of an integral game controller to manipulate the game, such as an integral joystick, rather than a controller supplied with the video game system itself U.S. Pat. No. 5,054,771 to Mansfield ("Mansfield") also discloses a computer interactive game machine with a swinging seat. Mansfield also discloses an integral video display monitor. Here, the machine includes a support structure, a seat mounted on the support structure and swingable along two axes, a handle bar mounted on the support structure in front of the seat for pivoting the seat about the two axes, and a position sensor responsive to movement of the seat. Mansfield also discloses feet stirrups that affect movement of the seat.

U.S. Pat. No. 4,461,470 to Astroth et al. ("Astroth") discloses a system for adding realism to a video display by moving a seated player and a video screen to correspond to a scene displayed on the video screen. Astroth discloses a stationary base unit and a platform supporting a chair and a console containing a video screen. The platform, through the use of a point support and a series of cables and pulleys, is simultaneously tiltable both front to back and side to side. Astroth also discloses a programming means that causes various views to be displayed on the screen, a drive means that causes the platform to tilt and a control means that causes the programming means and drive means to act in cooperation with one another.

U.S. Des. Pat. No. 334,487 to Perry ("Perry") also discloses a video game control seat. The Perry seat has a conical base that supports a single-piece seat and backrest in a fixed position. The seat and backrest are flared to extend partially around the occupant. An integral game controller rest, having a small flat upper surface, extends from one end of the lower flares.

U.S. Des. Pat. No. 260,823 to Stulik, Jr. ("Stulik") discloses a game chair. The Stulik chair is rectangular in shape, having a base, a seat, a backrest, and two arms. The base is a solid rectangle that rests on a floor surface and supports the chair. The arms each have an upper surface with depressions and the right arm has an extension portion protruding beyond the front of the chair. The extension portion appears to have buttons or switches and a depression, possibly for holding a game controller.

A video game accessory chair, The Virtual Vehicle JD, by Interactive I/O Inc., includes a frame supporting an adjustable seat, gas and brake pedals, and a monitor stand from which projects a steering wheel. The frame comprises two side rails, and an axle having a wheel on either end extends between the front portion of the sidewalls. The gas and brake pedals are disposed on a pedal support bar that extends between the sidewalls behind the axle. The seat is disposed on a pedal platform that is movably disposed on the side rails. Two substantially vertical rails support the monitor stand in front of the seat and a steering wheel projects out from the monitor stand toward the seat.

A one-piece seat capable of rocking is sold by The Step2 Company and is called the Lazy J Chair. This chair includes an integral curved bottom to provide a smooth front to back rocking motion.

Finally, The Intensor, by BSG Labs, Inc., includes a seat and backrest that may be folded together, five integral speakers for connection to the audio jack of a gaming system, and an optional office chair base. When utilized without the office base, the base appears to be rockable.

Thus, there is a need for a video game accessory chair apparatus that can enhance the video game playing experience while still using the existing video game system controllers.

There is a further need for a video game accessory chair apparatus that is rockable on a support surface in both front to back and side to side directions.

A need exists for a video game accessory chair apparatus that may optionally include a stabilizing system to prevent rocking of the chair if the occupant so desires.

Yet another need exists for a video game accessory chair apparatus that may also be adjustable so as to comfortably fit game players of various sizes.

SUMMARY OF THE INVENTION

In accordance with a preferred form of the present invention, there is provided a video game chair accessory apparatus for use with existing video game controllers. The apparatus includes a base, a console, and a seat portion. The base is concave in shape relative to both longitudinal and lateral axes so as to facilitate a rocking motion in both a front to back and a side to side direction. The console may be movably mounted on the front end of the base and the seat portion may be disposed on the rear end of the base. The top surface of the base may also include a series of recesses that provide storage capacity for game cartridges and the like.

The console may be adjustably placed along the front end of the base so as to permit comfortable seating for occupants of various sizes. Also, the console may include a pair of integral footrests. The console may further include a horizontal passage formed therethrough. The passage may be used to house the video game controller wiring, thereby avoiding the need to run the wires around or on top of the chair apparatus.

The present invention may also include a case that may be removably placed atop the console. The case may primarily be used for storage of game cartridges or controllers. However, the case may also be used as a convenient armrest while game playing. Therefore, a pad may be mounted on the front end of the case. To facilitate its use as a storage compartment, the case may include an openable and closeable lid. The top surface of the lid may include a recessed portion that conveniently stores the video game controller, while the inside of the case may include a series of walls that provide convenient storage of game cartridges, cassettes, compact disks, and the like.

The present invention may also include a controller mounting frame. This frame may be designed so as to provide a mounting apparatus for an existing video game controller, such as, for example, a steering wheel. According to one embodiment of the present invention, when the frame is used, the case is removed from the console top surface and replaced with the frame. When the frame is not in use, the present invention may also provide means for storing the frame. Such storage may consist of, for example, mounting the frame to the seat back portion.

Additional storage capacity may be provided by a basket that may be included with the present invention. The basket may be mounted on the console and may provide additional convenient storage for game controllers, cartridges, cassettes, compact disks, and the like.

With regard to the seat portion, the rear end of the base of the present invention may also comprise an integral V-shaped portion formed thereon. On one side of the V-shaped portion may be placed the seat portion, while on the other side may be placed a back portion that may be provided with the seat portion. When mounted, the back portion extends upwardly from the rear end of the base.

The present invention may also include an adjustable headrest mounted on the seat back portion. The headrest may include a downwardly projecting arm, while the seat back portion may have a chamber defined therein. The downwardly projecting arm may be adjustably secured within the chamber, thereby varying the vertical location of the headrest above the seat back portion. This feature also allows for comfortable seating of occupants of varying sizes. Within the headrest may be placed audio speakers that may be connected to the audio jack of the game control system, thereby further enhancing the game playing experience.

Further, the present invention may include fabric covered foam pads that may be attached to the seat portion, the back portion, and the headrest.

The present invention may also include base stabilizers. These stabilizers may be optionally deployed to prevent rocking of the base. The stabilizers of the present invention may include a foot with a bore integral therewith, and a nut. They may be secured to the base through the use of horizontally extending screw portions that may be formed integrally on the rear end of the base. The bores of the feet may overlay the screw portions and may be secured thereon with the nuts. The feet may then be swung into the deployed position wherein they rest on the floor, thereby preventing movement of the base. If rocking is desired, the feet may be swung off of the floor and maintained in such a position by tight application of the nut on the screw portion.

Accordingly, it is a feature of the present invention to provide a video game accessory chair apparatus that enhances the video game playing experience.

It is another feature of the present invention to provide a video game accessory chair apparatus with a longitudinally and laterally concave base that permits a rocking motion in both the front to back and the side to side directions.

Another feature of the present invention is to provide a video game accessory chair apparatus with a concave base that may also include stabilizers to prevent any rocking motion if the occupant so desires.

Yet another feature of the present invention is to provide a video game accessory chair apparatus that may be used with the existing video game controllers.

Still another feature of the present invention is to provide a video game accessory chair apparatus that may include an adjustable console and headrest so as to comfortably seat game players of various sizes.

It is also a feature of the present invention to provide a video game accessory chair apparatus that is safe, attractive, and fun to operate.

Accordingly, the present invention provides solutions to the shortcomings of prior video game accessory chairs. Those of ordinary skill in the art will readily appreciate, however, that these and other details, features, and advantages will become further apparent as the following detailed description of the preferred embodiments proceeds.

BRIEF DESCRIPTION OF THE DRAWINGS

In the accompanying Figures, there are shown present preferred embodiments of the invention wherein like reference numerals are employed to designate like parts and wherein.

DETAILED DESCRIPTION OF THE PREFERRED EMBODIMENTS

Figure 1:
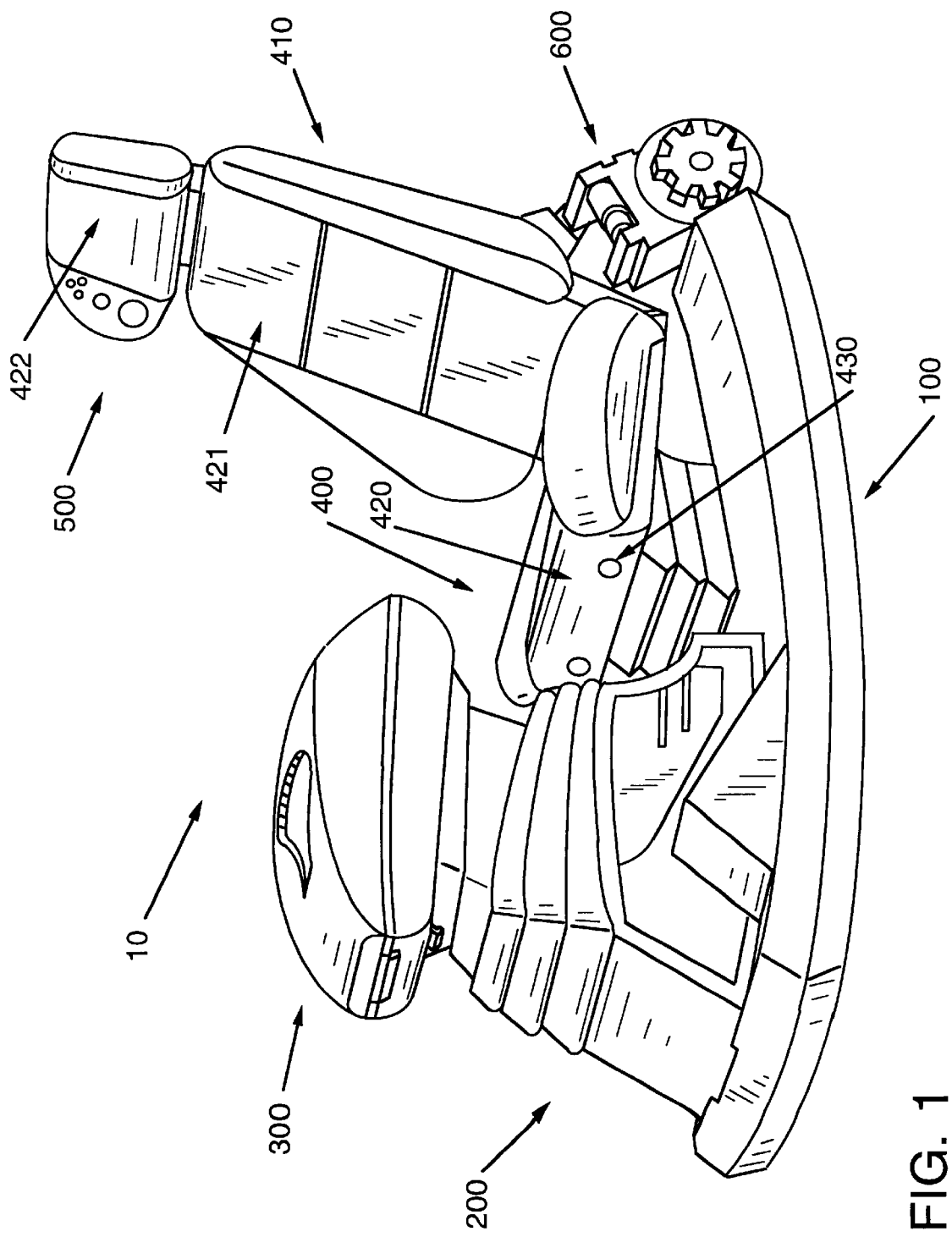
FIG. 1 is a perspective view of the video game accessory chair apparatus in accordance with the present invention.

Referring now to the drawings for the purposes of illustrating the present preferred embodiments of the invention only and not for the purposes of limiting the same, FIG. 1 depicts a video game chair apparatus 10 constructed according to one embodiment of the present invention. As can be seen in FIG. 1, the apparatus 10 includes a concave base 100, a console 200, and a seat portion 400. Also, in this embodiment, the apparatus 10 also includes a case 300, a headrest 500, and stabilizers 600.

Figure 2:
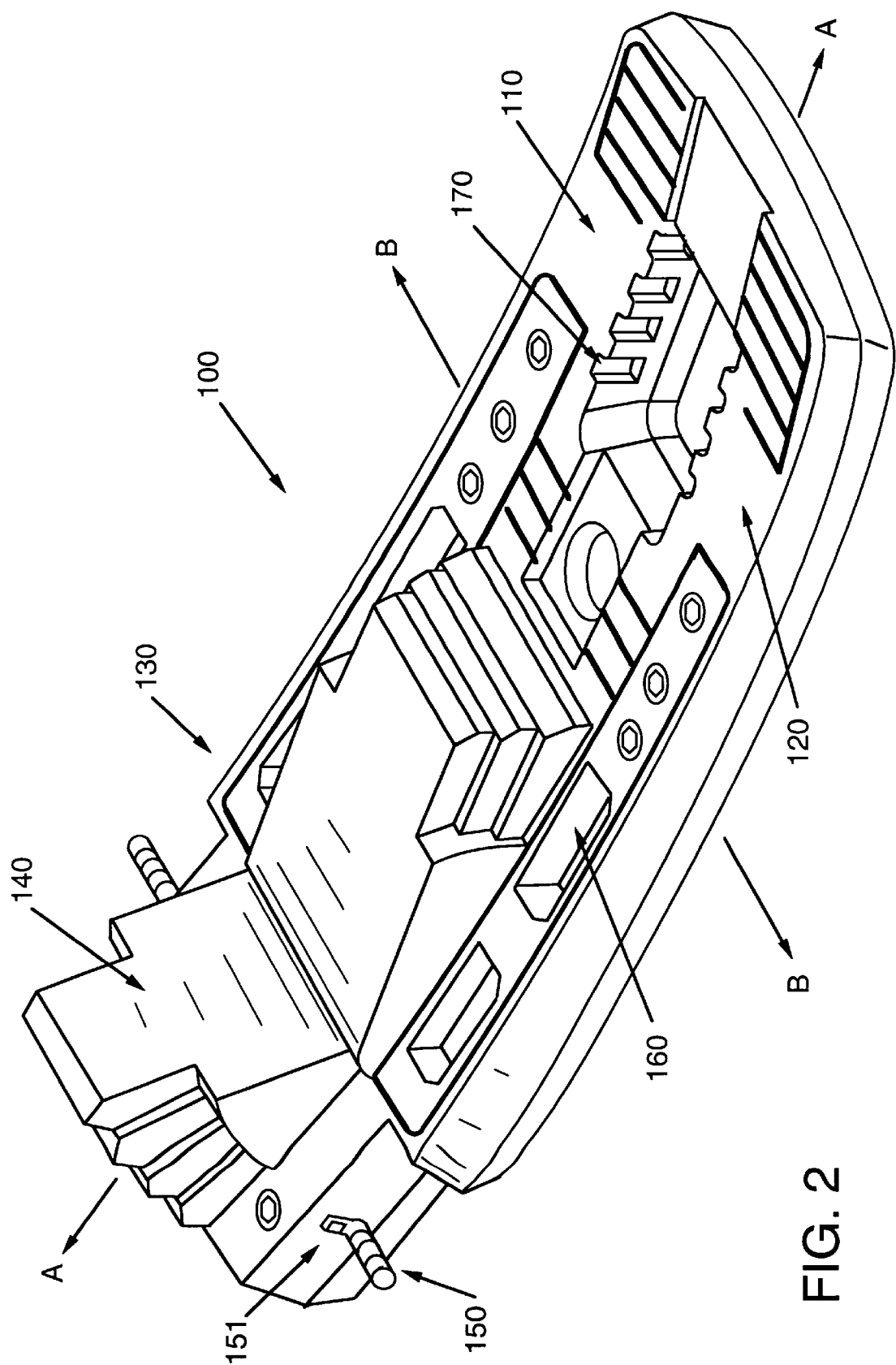
FIG. 2 is a perspective view of the concave base top surface in accordance with the present invention.

FIG. 2 is a perspective view of the base top surface 110. As is apparent in FIGS. 1 and 2, the base 100 is concave in shape, both along a longitudinal axis A—A and along a lateral axis B—B, thereby facilitating a rocking motion in both a front to back and a side to side direction. The base 100 has both a front portion 120 and a rear portion 130. In this embodiment, there is formed, integrally with the base top surface 110 and disposed at the rear end 130, a V-shaped portion 140. As will be described in more detail below, the V-shaped portion 140 supports the seat portion 400 and a back portion 410.

Returning now to the base top surface 110, there is seen a horizontally extending screw portion 150 with a lug 151 extending outwardly from each lateral side of the base rear portions 130. As will be described in more detail below, the horizontally extending screw portion 150 is used to attach the stabilizers 600 to the base 100.

The base top surface 110 also includes a plurality of recessed portions 160 that may conveniently store video game cassettes, cartridges, compact disks, and the like. At the base front end 120 are seen a series of slots 170. These slots 170 permit adjustable location of the console 200 on the base top surface 110, thereby allowing the apparatus 10 to comfortably seat occupants of various sizes.

Figure 3:
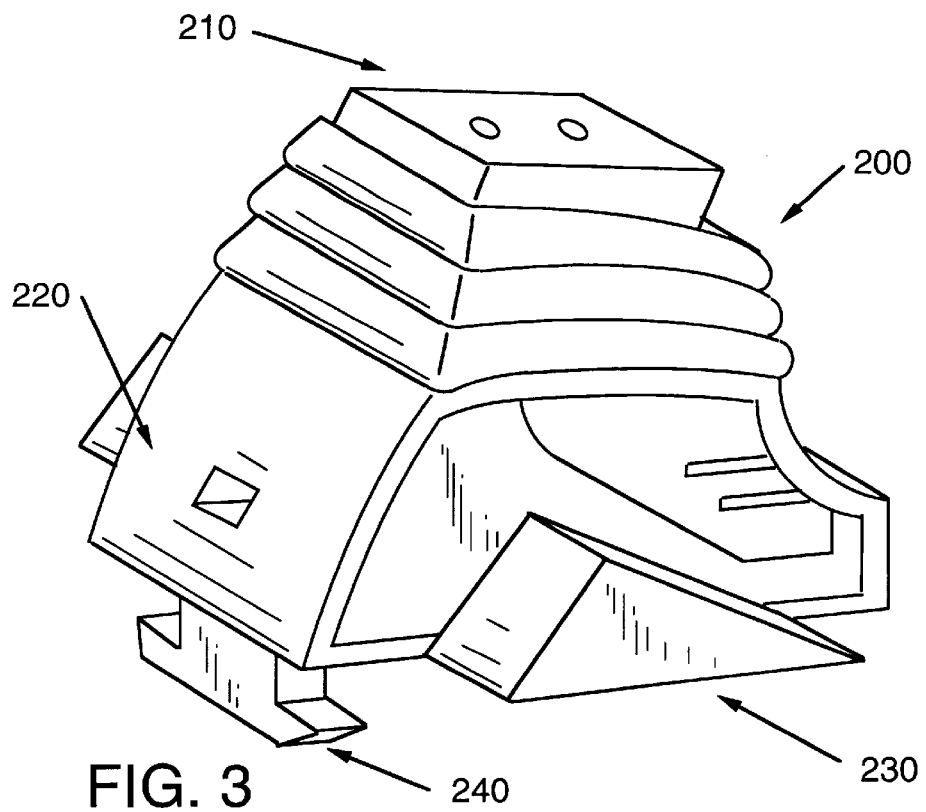
FIG. 3 is a perspective view of the console in accordance with the present invention.

Referring now to the console 200 as depicted in the perspective view of FIG. 3, there is seen that the console 200 may include a top surface 210, a horizontal passage 220, and foot rest portions 230. In this embodiment, the console 200 is a single piece molded article, wherein the foot rest portions 230 are formed integrally with the console 200. The horizontal passage 220 may be provided so as to allow placement of an existing game controller's wiring therein. This arrangement eliminates the need to run such wiring around or atop the apparatus 10. With respect to securing the console 200 to the base top surface 110 through the use of the slots 170, it is seen that the console 200 may contain a downwardly projecting notch 240. The downwardly projecting notch 240 fits securely within a slot 170, but can also be easily removed and replaced in another slot 170.

Figure 4:
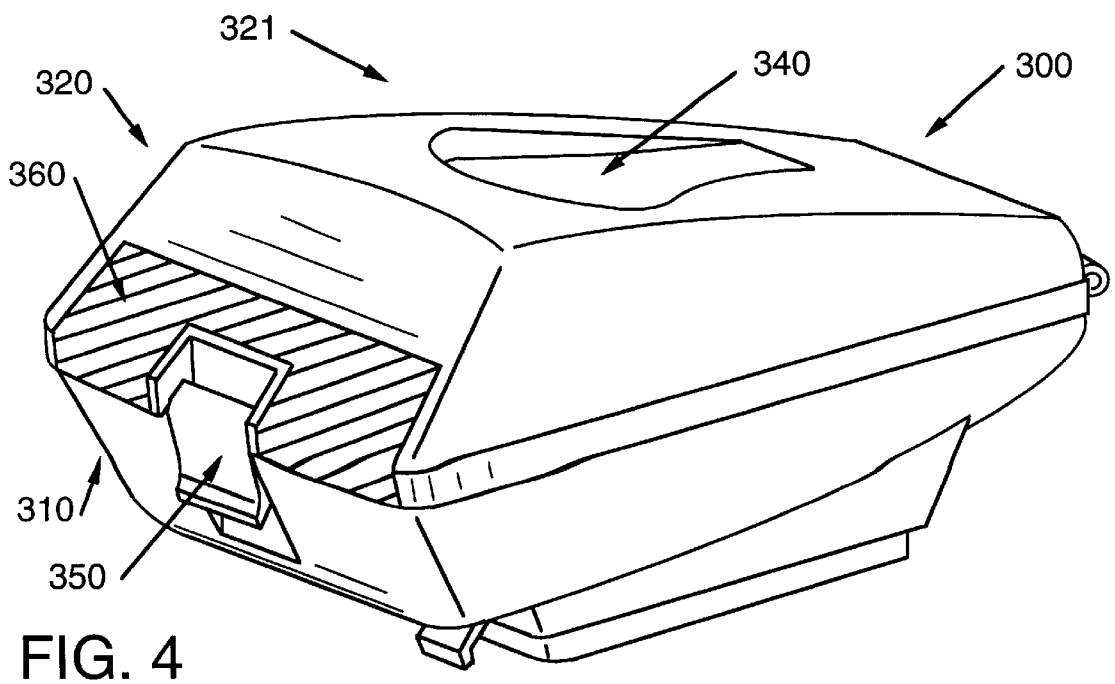
FIG. 4 is a perspective view of the case in accordance with the present invention.
Figure 5:
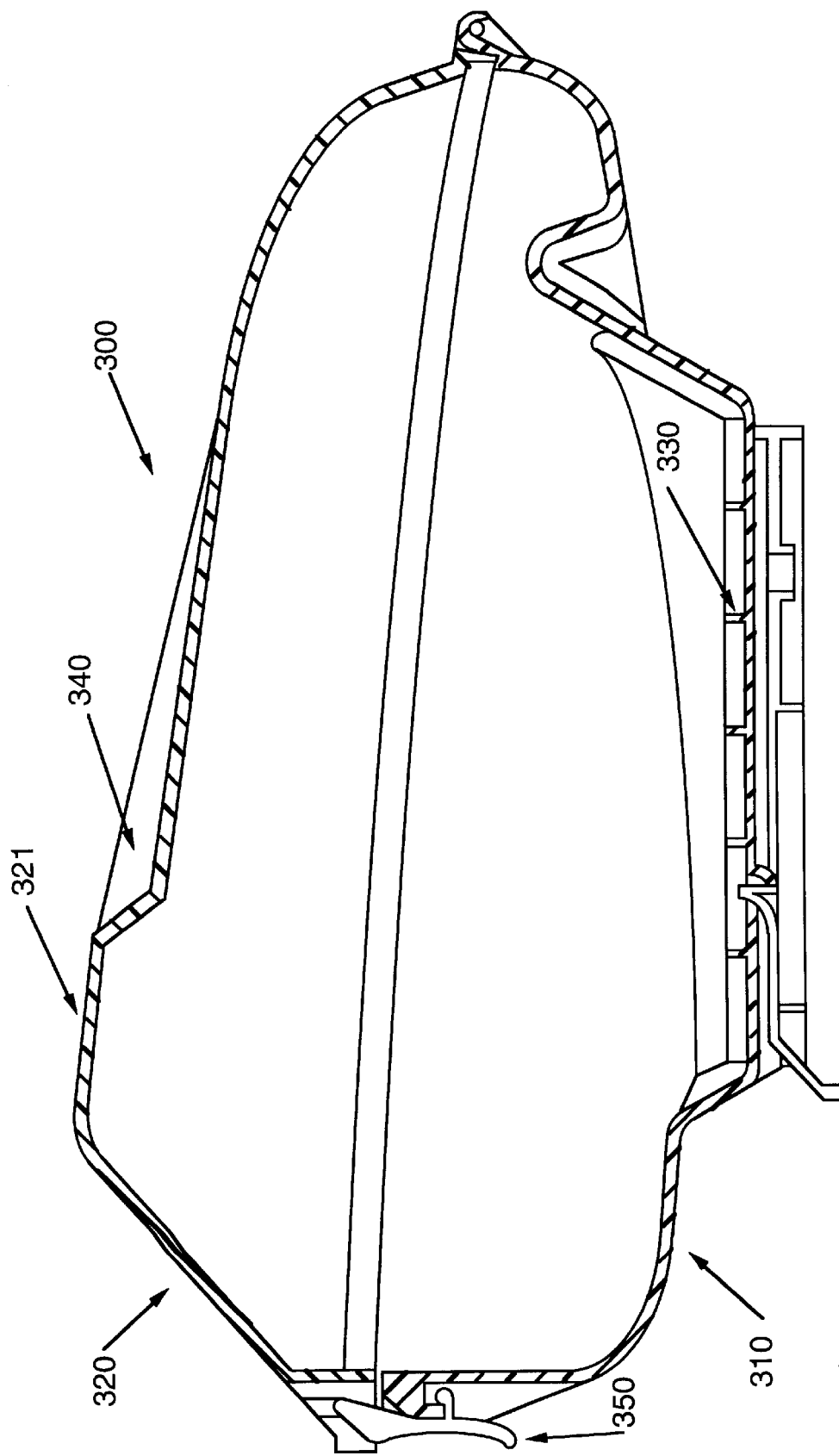
FIG. 5 is a side cross-sectional view of the case in accordance with the present invention.

As mentioned above, the present invention may also include a case 300 as depicted in FIGS. 4 and 5. FIG. 4 shows a perspective view of the case 300, while FIG. 5 presents a cross-sectional side view. The case 300, as shown in FIG. 1, is placed upon the console top surface 210. The case 300 includes a front portion 310 and a lid 320. As is seen, the lid 320 comprises a top surface 321 wherein there may be formed a recessed portion 340. The recessed portion 340 provides convenient temporary storage of a video game controller or other article. As is also apparent from FIG. 4, the present invention may also include a pad 360 disposed on the case front portion 310. This pad 360 allows the occupant of the apparatus 10 to comfortably place his or her hands on the case front end 310 while playing a video game.

Referring now to FIG. 5, it is seen that the interior of the case 300 contains a plurality of parallel extending walls 330. These walls provide additional convenient means for storing video game cassettes, cartridges, compact disks, and the like. Also, it is seen that a latch 350 is disposed on the case front end 310. The latch 350, when engaged, secures the lid 320 in a closed position.

Figure 6:
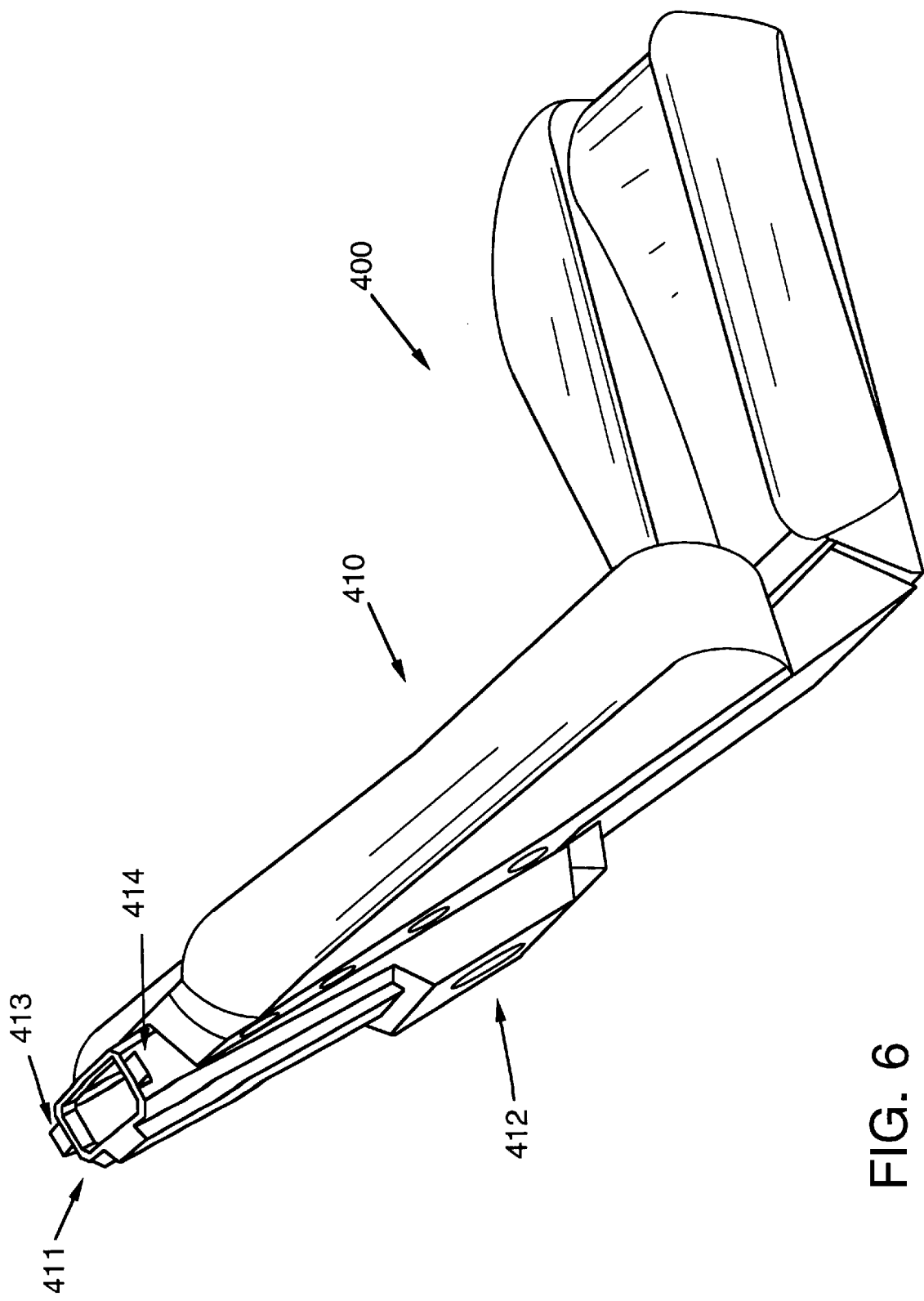
FIG. 6 is a perspective view of the seat portion and back portion in accordance with the present invention.

With respect to the seat portion 400, refer now to FIG. 6. As is apparent, the seat portion 400 may include a back portion 410 extending upwardly therefrom. As mentioned above, the seat portion 400 is arranged on the base 100 through the use of the V-shaped portion 140. To provide a comfortable seating arrangement, the seat portion 400 is placed upon one side of the V-shaped portion 140, while the back portion 410 lies upon the other side of the V-shaped portion 140.

Figure 7:
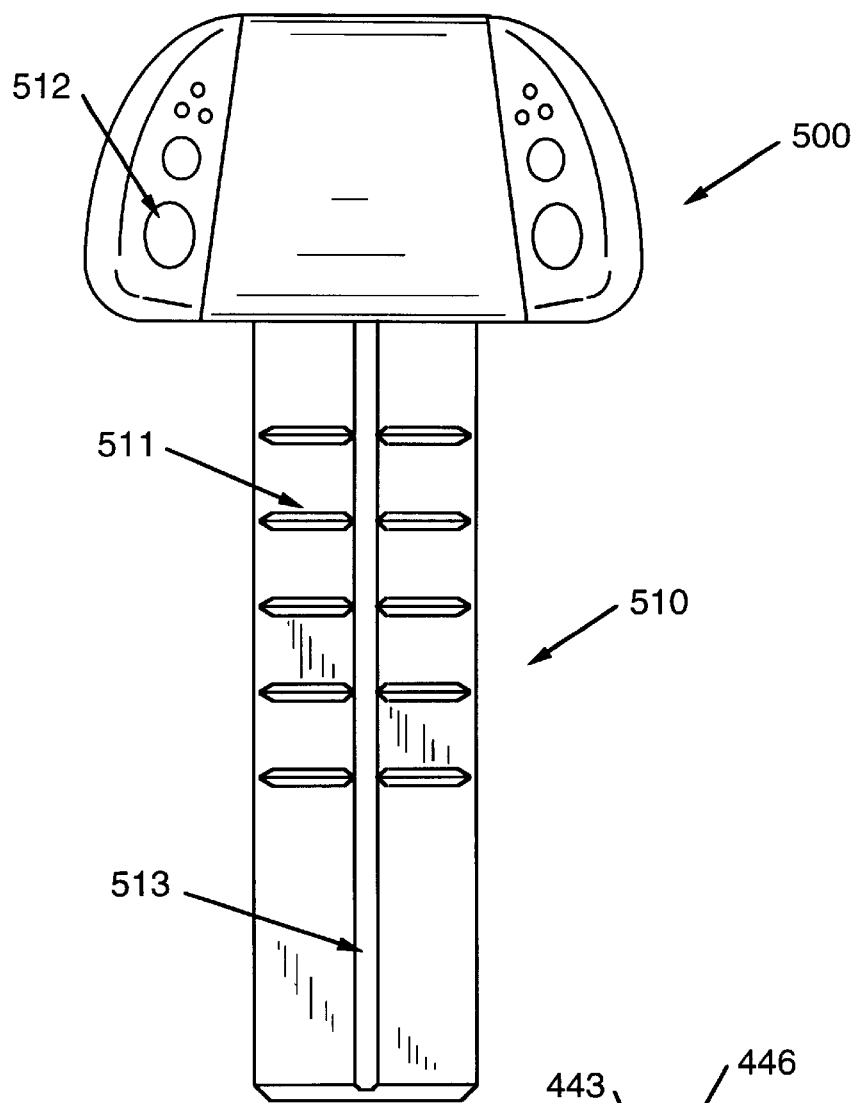
FIG. 7 is a front elevational view of the headrest in accordance with the present invention.
Figure 7A:
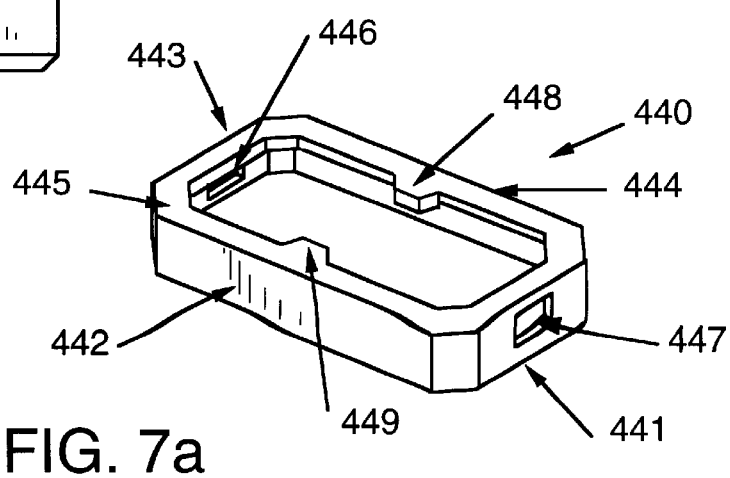
FIG. 7a is a perspective view of the cap which supports the headrest in accordance with this invention.

Referring now to FIGS. 6 and 7, it is seen how a headrest 500 is adjustably mounted to the seat back portion 410. According to this embodiment, the headrest 500 includes a downwardly extending arm 510 upon which is formed a track 513 and a plurality of recesses 511. Referring to FIG. 7a, there is seen a cap 440. The cap 440 includes two pairs of opposed sides 441, 442, 443, and 444. Extending from the top of each side is a lip 445, whereon a pair of protrusions 448 and 449 extend inwardly. Further, a first pair of the opposed sides include apertures 446 and 447 formed therein. The cap 440 is shaped to fit around the downwardly extending arm 510 such that the pair of protrusions 448 and 449 fit within the track 513. To secure the headrest 500 into position, the lip 445 is placed within the selected recesses 511 according to the desired height of the headrest 500. The downwardly extending arm 510 is then inserted into a chamber 412 that is formed on the seat back portion top surface 411. Within the chamber 412 there is an elongated protrusion (not shown) that extends outwardly from the seat back portion 410. The protrusion may be shaped to fit within the track 513 thereby preventing side-to-side movement of the headrest 500. Also, as in seen in FIG. 6, the seat back portion top surface 411 includes a pair of notches 413 and 414. As the downwardly extending arm 510 is inserted into the chamber 412, the cap 440 eventually comes to rest on the back portion top surface 41 1. As this occurs, the notches 413 and 414 are inserted into the apertures 446 and 447, thereby locking the headrest 500 into place.

FIG. 7 also depicts another embodiment of the present invention where at least one audio speaker 512 is mounted in the headrest. The audio speaker 512 may be connected to the video game, thereby enhancing the game playing experience.

Referring once again to FIG. 1, there is seen that foam pads 420, 421, and 422 may overlay the seat portion 400, the back portion 410, and the headrest 500. The foam pads 420, 421, and 422 may consist of a fabric covered polyurethane foam, and may be secured thereto with fasteners 430. The fasteners 430 may be pins, push fasteners, or the like, such that the foam pads 420, 421, and 422 may be easily removed.

Figure 8:
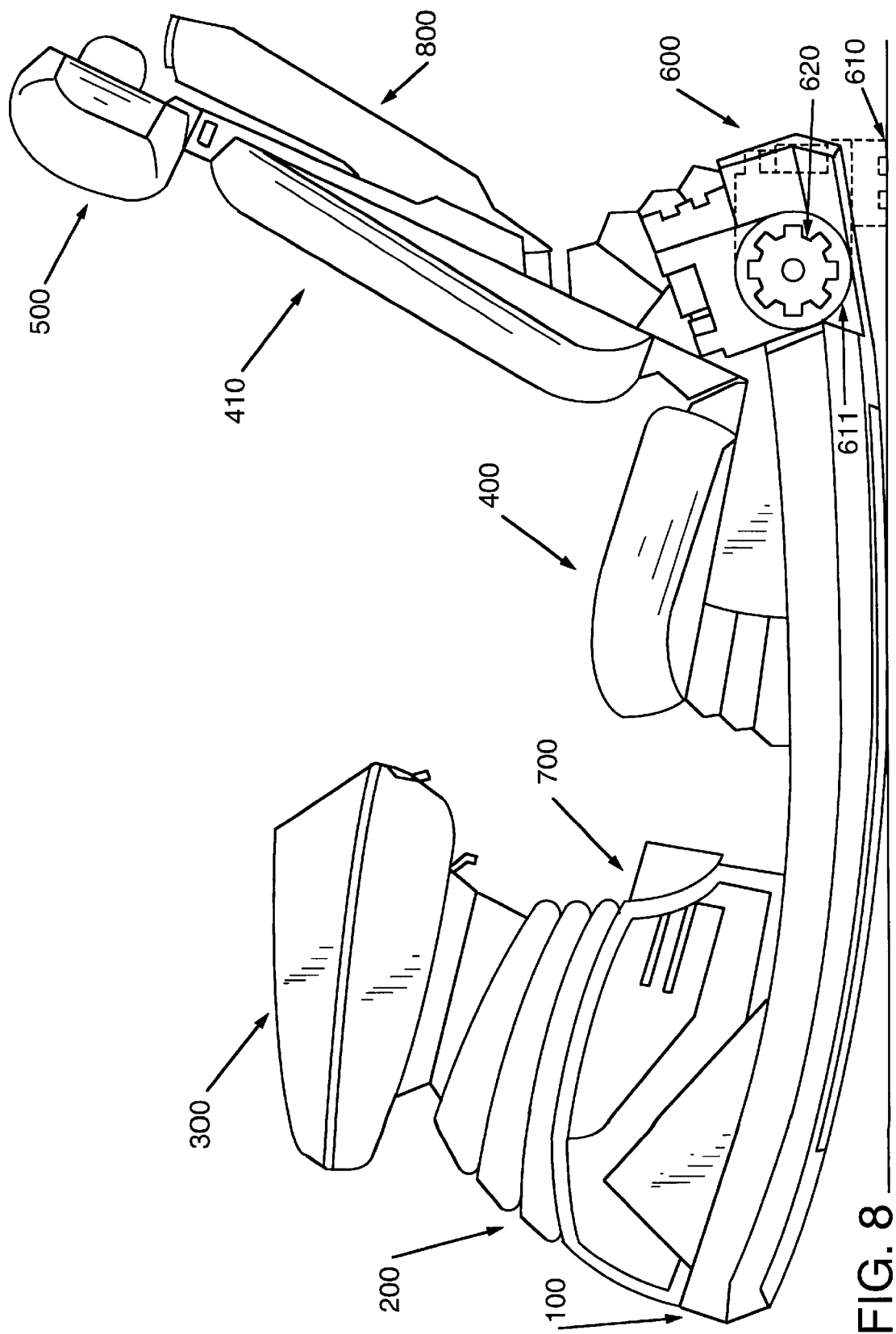
FIG. 8 is a side elevational view of the apparatus with a controller mounting frame in a storage position in accordance with the present invention, and a stabilizer in accordance with the present invention where the stabilizer is shown in both the deployed (dotted line) and retracted position.

Referring now to FIG. 8, there is seen a stabilizer 600 in accordance with one embodiment of the present invention. It will be understood that an identical stabilizer 600 is provided on each lateral side of the base 100. As is apparent, each stabilizer 600 includes a foot 610 with a bore 611 therethrough, and a nut 620. A key feature of the stabilizers 600 of this embodiment is the fact that they can be deployed, thereby preventing any rocking motion of the base 100, or they can be retracted, thereby allowing the base 100 to rock both front to back and side to side. In FIG. 8, the dashed lines show the position of the stabilizers 600 when they are deployed, while the solid lines show the position of the stabilizers 600 when they are retracted.

Figure 10A:
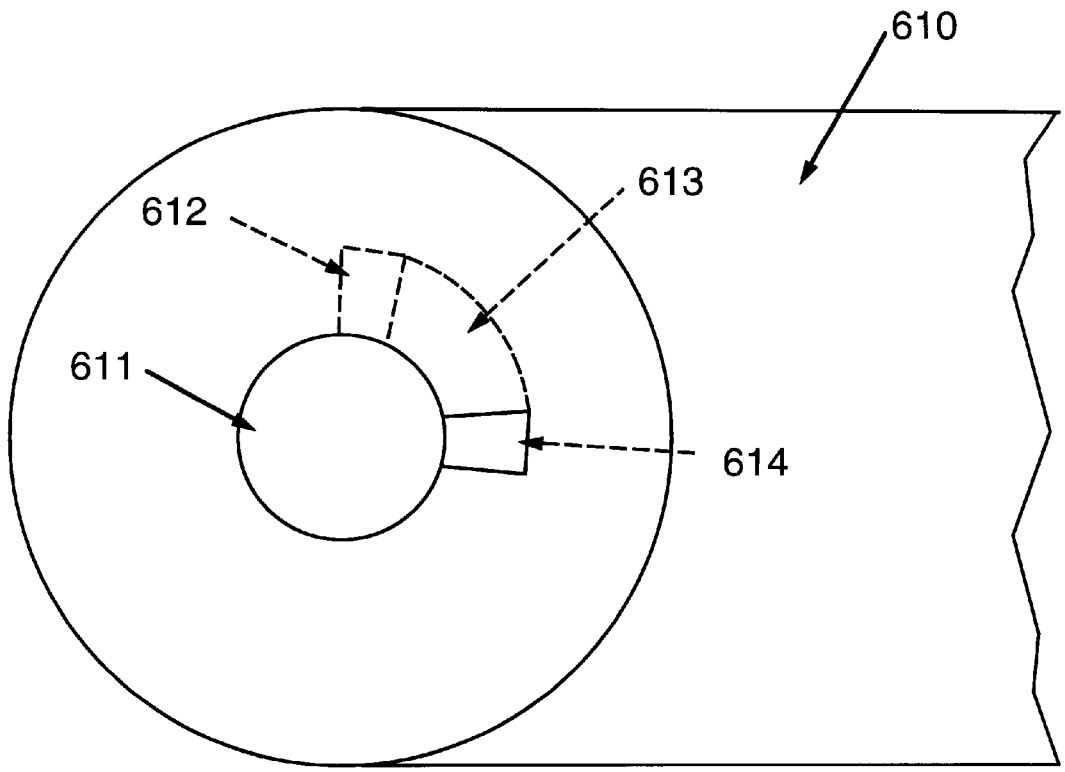
FIGS. 10a and 10b show both an elevational and a cross-sectional plan views, respectively, of the stabilizer bore and recessed portions.
Figure 10B:
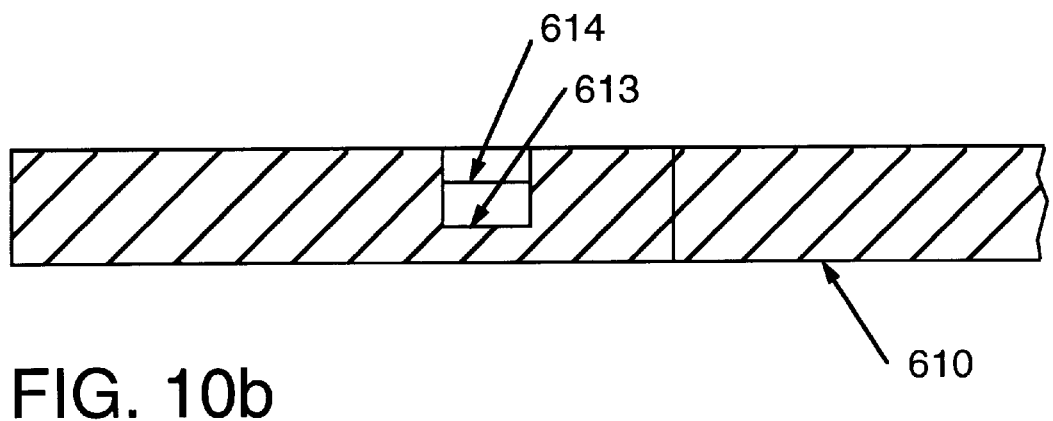

Now, with regard to the mounting of the stabilizer 600 on the base 100, reference is made once again to the horizontally extending screw portions 150. As mentioned above, the horizontally extending screw portions 150 extend from the base rear portion 130 (See FIG. 2), and include a lug 151. To mount the stabilizer 600, the bore 611 is slid over the horizontally extending screw portion 600 until it contacts the base 100. Referring now to FIG. 10, it is seen that the bore 611 includes a first recessed portion 612, a second recessed portion 613, and a third recessed portion 614. To lock the foot 610 in the deployed position, the lug 151 is engaged in the first recessed portion 612. A nut 620 is then placed on the horizontally extending screw portion 150 and tightened until the foot 610 is secured in the desired position. To move the foot to the retracted position, the nut 620 is simply loosened, the foot 610 is adjusted so that the lug 151 is engaged in the third recessed portion 614, and the nut 620 is re-tightened.

Referring once again to FIG. 8 there is seen a removable storage basket 700 that may be provided according to one embodiment of the present invention. The storage basket 700 may be removably mounted to the console 200. The storage basket 700 may provide additional convenient storage capacity for video game controllers, cartridges, cassettes, compact disks, and the like.

Also shown on FIG. 8 is a controller mounting frame 800 in accordance with one embodiment of the present invention. Here, the controller mounting frame 800 is shown in a storage position whereby it is mounted upon the seat back portion 410.

Figure 9:
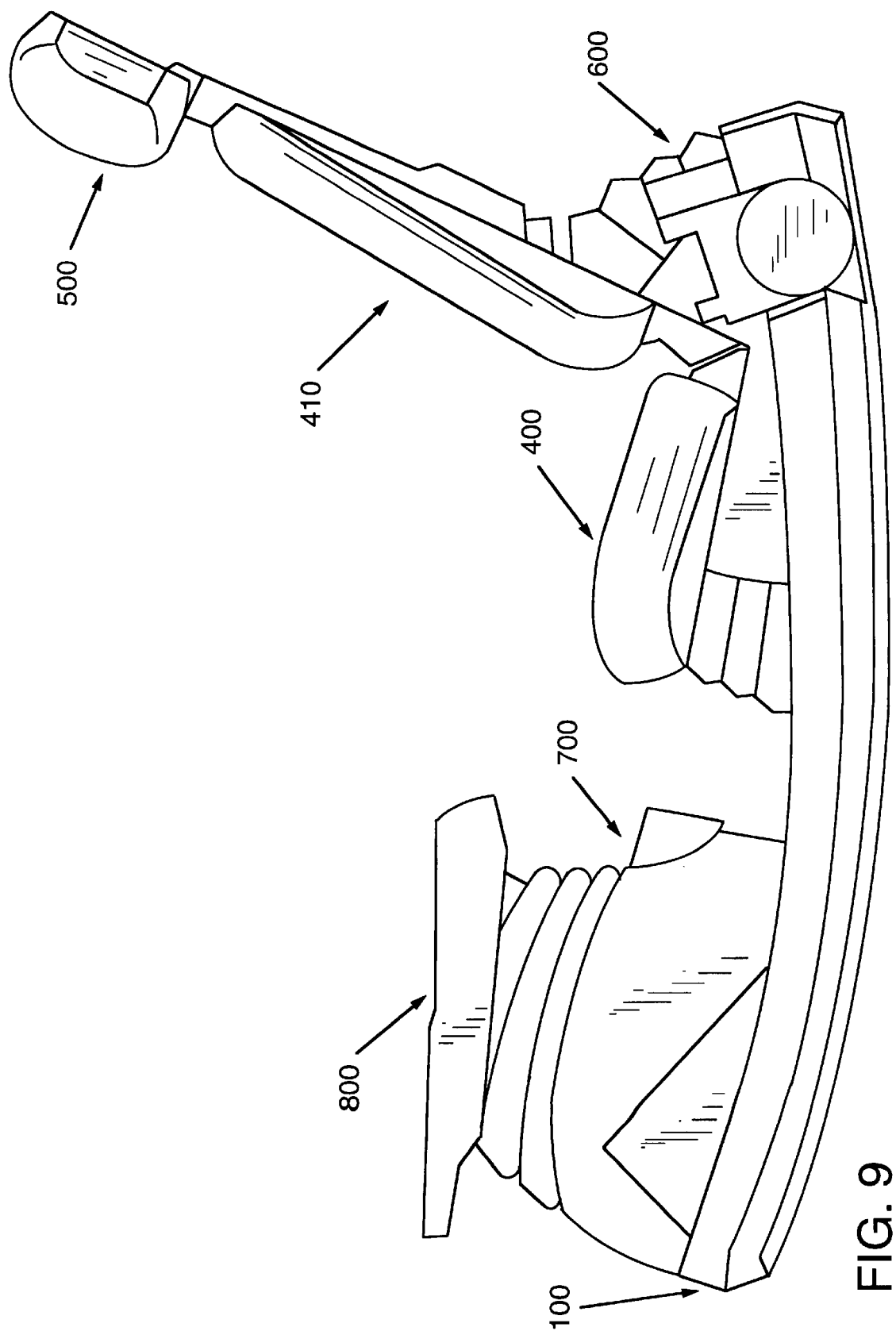
FIG. 9 is a side elevational view of the apparatus with a controller mounting frame in an operational position in accordance with the present invention, and a stabilizer in accordance with the present invention where the stabilizer is shown in the retracted position.

Now referring to FIG. 9, there is seen yet another embodiment of the present invention. Here, the controller mounting frame 800 is in the operational position. As can be seen, when in the operable position, the controller mounting frame 800 replaces the case 300 on the console top surface 210. According to this embodiment, therefore, the frame 800 is capable of supporting an existing video game controller such as, for example, a steering wheel. Further, the top side of the controller mounting frame 800 contains a plurality of apertures (not shown) upon which a game controller may be mounted and also, upon which other items, such as drinks, may be placed.

Thus, from the foregoing discussion, it is apparent that the present invention represents a vast improvement over prior video game accessory chair apparatuses. The apparatus of the present invention enhances the video game playing experience, while still allowing the occupant to use the existing video game system controllers. The apparatus of the present invention is rockable in both a front to back and a side to side direction. Further, the apparatus of the present invention is safe, attractive, and fun to operate. Those of ordinary skill in the art will, of course, appreciate that various changes in the details, materials, and arrangement of parts which have been herein described and illustrated in order to explain the nature of the invention may be made by the skilled artisan within the principal and scope of the invention as expressed in the appended claims.

What is claimed is:

1. A chair apparatus for use with video game controllers, said apparatus comprising:
   a longitudinally and laterally concave base comprising a top surface, a front portion and a rear portion;
   a console mounted on said base front portion, said console comprising a top surface; and
   a seat portion disposed on said base rear portion.

2. The apparatus of claim 1 wherein said base top surface comprises a plurality of recessed portions disposed thereon.

3. The apparatus of claim 1 wherein said console further comprises at least one foot rest.

4. The apparatus of claim 1 wherein said console further comprises a horizontal passage extending therethrough.

5. The apparatus of claim 1 wherein said console is movably mounted on said base top surface at said base front portion.

6. The apparatus of claim 1 further comprising a storage basket removably mounted on said console.

7. The apparatus of claim 1 further comprising a case mounted on said console top surface, said case comprising a front end and a hinged lid with a top surface.

8. The apparatus of claim 7 wherein said case is removably mounted on said console.

9. The apparatus of claim 7 wherein said case comprises a plurality of parallel extending walls mounted therein.

10. The apparatus of claim 7 wherein said case comprises a pad mounted on said case front end.

11. The apparatus of claim 7 wherein said case comprises a recessed portion disposed on said lid top surface.

12. The apparatus of claim 1 further comprising a frame mounted upon said console top surface, said frame comprising a top surface.

13. The apparatus of claim 12 wherein said frame top surface comprises a plurality of apertures formed therein.

14. The apparatus of claim 1 wherein said seat portion comprises a pad supported thereon.

15. The apparatus of claim 1 wherein said base further comprises a V-shaped portion mounted upon said base top surface at said base rear portion and wherein said seat portion is mounted upon said V-shaped portion.

16. The apparatus of claim 1 wherein said seat portion comprises a back portion extending upwardly therefrom, said back portion comprising a top surface.

17. The apparatus of claim 16 wherein said back portion comprises a pad supported thereon.

18. The apparatus of claim 16 further comprising a headrest, said headrest being mounted on said back portion top surface.

19. The apparatus of claim 18 wherein said headrest comprises a pad supported thereon.

20. The apparatus of claim 18 wherein:
   said back portion comprises a chamber defined therein and wherein said chamber extends to said back portion top surface; and
   said headrest comprises a downwardly projecting arm wherein said arm is adjustably mounted within said chamber.

21. The apparatus of claim 20, further comprising:
   an elongated, outwardly projecting protrusion formed on said back portion;
   a pair of notches formed on said back portion top surface;
   a plurality of recesses and a track formed on said downwardly extending arm; and
   a cap, said cap comprising two pairs of opposed walls, a lip, a pair of protrusions extending inwardly from said lip, and an aperture formed on one pair of said opposed sides.

22. The apparatus of claim 18 wherein said headrest comprises at least one audio speaker mounted therein.

23. The apparatus of claim 1 further comprising at least one movably mounted body stabilizer.

24. The apparatus of claim 23 wherein:
said concave base further comprises a pair of horizontally extending screw portions mounted on said base rear portion, each of said horizontally extending screw portions comprising a lug; and
said at least one stabilizer comprises:
at least one foot, each foot comprising a bore secured thereto wherein said
bore comprises a plurality of recessed portions, and said bore overlays said
horizontally extending screw portion, and
a nut adjustably securing said foot bore to said horizontally extending screw portion.

25. A chair apparatus for use with video game controllers, said apparatus comprising:
a longitudinally and laterally concave base comprising a top surface, a front portion, a rear portion, a V-shaped portion mounted upon said base top surface at said base rear portion, and a pair of horizontally extending screw portions mounted on said base rear portion, each of said horizontally extending screw portions comprising a lug;
a console mounted on said base top surface at said base front portion, said console comprising a top surface;
a case mounted on said console top surface, said case comprising a front portion and a lid comprising a top surface;
a seat portion mounted upon said V-shaped portion, said seat portion comprising a back portion extending upwardly therefrom, said back portion comprising a top surface and a chamber, said chamber being defined in said back portion and wherein said chamber extends to said back portion top surface;
a headrest comprising a downwardly projecting arm portion wherein said arm is adjustably mounted within said chamber; and
at least one movably mounted body stabilizer, said at least one stabilizer comprising:
at least one foot, each foot comprising a bore secured thereto wherein
said bore comprises a plurality of recessed portions to engage said lug
and said bore overlays said horizontally extending screw, and
a nut adjustably securing said bore to said horizontally extending screw.

26. The apparatus of claim 25 wherein said base top surface comprises a plurality of recessed portions disposed thereon.

27. The apparatus of claim 25 wherein said console further comprises a horizontal passage extending therethrough.

28. The apparatus of claim 25 wherein said console further comprises at least one foot rest.

29. The apparatus of claim 25 wherein said console is movably mounted on said base top surface at said base front portion.

30. The apparatus of claim 25 wherein said case is removably mounted on said console.

31. The apparatus of claim 25 wherein said case further comprises a plurality of parallel extending walls mounted therein.

32. The apparatus of claim 25 wherein said case further comprises a recessed portion disposed on said lid top surface.

33. The apparatus of claim 25 wherein said headrest comprises at least one audio speaker mounted therein.

34. The apparatus of claim 25, further comprising:
an elongated, outwardly projecting protrusion formed on said back portion;
a pair of notches formed on said back portion top surface;
a plurality of recesses and a track formed on said downwardly extending arm; and
a cap, said cap comprising two pairs of opposed walls, a lip, a pair of protrusions extending inwardly from said lip, and an aperture formed on one pair of said opposed sides.

35. The apparatus of claim 25 wherein said seat portion, said back portion, and said headrest comprise a pad removably fastened thereon.

36. A chair apparatus for use with video game controllers, said apparatus comprising:
a concave base comprising a top surface, a front portion, a rear portion, a V-shaped portion mounted upon said base top surface at said base rear portion, and a pair of horizontally extending screw portions mounted on said base rear end, each of said horizontally extending screw portions comprising a lug;
a console mounted on said base top surface at said base front portion, said console comprising a base top surface;
a frame mounted upon said console top surface, said frame comprising a top surface;
a seat portion mounted upon said V-shaped portion, said seat portion comprising a back portion extending upwardly therefrom, said back portion comprising a top surface and a chamber, said chamber being defined in said back portion and wherein said chamber extends to said back surface top surface;
a headrest comprising a downwardly projecting arm portion wherein said arm is adjustably mounted within said chamber; and
at least one movably mounted body stabilizer, said at least one stabilizer comprising:
at least one foot, each foot comprising a bore secured thereto wherein said bore comprises a plurality of recessed portions and said bore overlays said horizontally extending screw, and
a nut adjustably securing said bore to said horizontally extending screw.

37. The apparatus of claim 36 wherein said base top surface comprises a plurality of recessed portions disposed therein.

38. The apparatus of claim 36 wherein said console further comprises a horizontal passage extending therethrough.

39. The apparatus of claim 36 wherein said console further comprises at least one foot rest.

40. The apparatus of claim 36 wherein said console is movably mounted on said base top surface at said base front portion.

41. The apparatus of claim 36 further comprising a basket removably mounted on said console.

42. The apparatus of claim 36 wherein said frame is movably mounted on said console.

43. The apparatus of claim 36 wherein said frame top surface comprises a plurality of apertures formed therein.

44. The apparatus of claim 36 wherein said headrest comprises at least one speaker mounted therein.

45. The apparatus of claim 36, further comprising:

an elongated, outwardly projecting protrusion formed on said back portion;

a pair of notches formed on said back portion top surface;

a plurality of recesses and a track formed on said downwardly extending arm; and a cap, said cap comprising two pairs of opposed walls, a lip, a pair of protrusions extending inwardly from said lip, and an aperture formed on one pair of said opposed sides.

46. The apparatus of claim 36 wherein said seat portion, said back portion, and said headrest comprise a pad supported thereon.

* * * * *